US009319820B2

(12) United States Patent
Boustead et al.

(10) Patent No.: US 9,319,820 B2
(45) **Date of Patent: *Apr. 19, 2016**

(54) APPARATUSES AND METHODS FOR USE IN CREATING AN AUDIO SCENE FOR AN AVATAR BY UTILIZING WEIGHTED AND UNWEIGHTED AUDIO STREAMS ATTRIBUTED TO PLURAL OBJECTS

(75) Inventors: Paul Andrew Boustead, Figtree (AU); Farzad Safaei, Mt Keira (AU); Mehran Dowlatshahi, Artarmon (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 2009 days.

This patent is subject to a terminal disclaimer.

(21) Appl. No.: 10/575,644

(22) PCT Filed: Apr. 15, 2005

(86) PCT No.: PCT/AU2005/000534

§ 371 (c)(1), (2), (4) Date: May 27, 2008

(87) PCT Pub. No.: WO2005/101897

PCT Pub. Date: Oct. 27, 2005

(65) Prior Publication Data

US 2008/0234844 A1 Sep. 25, 2008

(30) Foreign Application Priority Data

Apr. 16, 2004 (AU) ................................ 2004902027
Jul. 8, 2004 (AU) ................................ 2004903760

(51) Int. Cl.
*G10L 21/06* (2013.01)
*H04M 5/00* (2006.01)

(Continued)

(52) U.S. Cl.
CPC . *H04S 7/30* (2013.01); *H04S 3/002* (2013.01); *H04S 2400/11* (2013.01)

(58) Field of Classification Search
CPC ............ H04Q 3/00; H04M 3/56; G10L 21/06
USPC ..................... 704/235, 276; 709/205; 700/94; 379/202.01
See application file for complete search history.

(56) References Cited

U.S. PATENT DOCUMENTS 5,736,982 A 4/1998 Suzuki et al.
6,011,851 A 1/2000 Connor (Continued)

FOREIGN PATENT DOCUMENTS

BE 1015649 A3 7/2005
GB 2 335 581 9/1999

(Continued)

OTHER PUBLICATIONS

Australian Patent Office "Examiner's First Report" received in Australian Application No. 2011200737, mail date Jun. 29, 2011, 2 pages.

(Continued)

*Primary Examiner* — Farzad Kazeminezhad

(57) ABSTRACT

An apparatus for creating an audio scene for an avatar in a virtual environment, the apparatus comprising: an audio processor operable to create a weighted audio stream that comprises audio from an object located in a portion of a hearing range of the avatar; and associating means operable to associate the weighted audio stream with a datum that represents a location of the portion of the hearing range in the virtual environment, wherein the weighted audio stream and the datum represent the audio scene. The weighted Audio stream also includes an unweighted audio stream that comprises audio from another object located in the hearing range of the avatar.

12 Claims, 12 Drawing Sheets

(51) Int. Cl.

| | |
|---|---|
| ***G06F 15/16*** | (2006.01) |
| ***H04S 7/00*** | (2006.01) |
| ***H04S 3/00*** | (2006.01) |

(56) References Cited

U.S. PATENT DOCUMENTS

| | | | | |
|---|---|---|---|---|
| 7,006,616 | B1 * | 2/2006 | Christofferson et al. | 379/202.01 |
| 2002/0013813 | A1 | 1/2002 | Matsuoka | |
| 2004/0075677 | A1 * | 4/2004 | Loyall | G10L 13/00 715/706 |
| 2005/0069143 | A1 | 3/2005 | Budnikov | |
| 2005/0216558 | A1 * | 9/2005 | Flesch et al. | 709/205 |

FOREIGN PATENT DOCUMENTS

| | | |
|---|---|---|
| JP | 11-232488 | 8/1999 |
| JP | 11232488 | 8/1999 |
| JP | 2000-013900 | 1/2000 |
| JP | 2000139000 | 5/2000 |
| KR | 2003000065495 | 9/2003 |
| WO | WO 99/41880 | 8/1999 |
| WO | WO 01/85293 | 5/2000 |
| WO | WO 01/62042 | 2/2001 |
| WO | WO 03/009639 | 7/2002 |
| WO | WO 2005/066918 | 12/2003 |

OTHER PUBLICATIONS

Australian Patent Office "Examiner's First Report" received in Australian Application No. 2011200742, mail date Jun. 29, 2011, 2 pages.

The Korean Intellectual Property Office "Notification of the Reasons for Rejection" received in Korean Application No. 10-2006-7023928, mail date Aug. 1, 2011, 4 pages. (English translation).

* cited by examiner

501

| Cell Number | Streams to be mixed (Without Weight) | Centre of Mass of the Cell |
|---|---|---|
| 1 | $S_i, S_j, S_k$ | $x_1, y_1$ |
| ⋮ | | |
| M | ... | |

Fig. 5

1001

| *Avatar Number* | Cluster Summary Streams | Location Co-ord |
|---|---|---|
| 1 | $W_i \times Z_i$, $W_h \times Z_h$ | |
| | ... | |
| ⋮ | | |
| A | ... | |

Fig. 10

APPARATUSES AND METHODS FOR USE IN CREATING AN AUDIO SCENE FOR AN AVATAR BY UTILIZING WEIGHTED AND UNWEIGHTED AUDIO STREAMS ATTRIBUTED TO PLURAL OBJECTS

CROSS REFERENCE TO RELATED APPLICATION

The present application is a 35 U.S.C. §§371 national phase conversion of PCT/AU2005/000534, filed Apr. 15 2005, which claims priority of Australian Patent Application No. 2004902027, filed Apr. 16, 2004 and Australian Patent Application No. 2004903760 filed Jul. 8, 2004, which is herein incorporated by reference. The PCT International Application was published in the English language.

FIELD OF THE INVENTION

The present invention relates generally to apparatuses and methods for use in creating an audio scene, and has particular—but by no means exclusive—application for use in creating an audio scene for a virtual environment.

BACKGROUND OF THE INVENTION

There have been significant advances in creating visually immersive virtual environments in recent years. These advances have resulted in the widespread uptake of massively multi-player role-playing games, in which participants can enter a common virtual environment (such as a battlefield) and are represented in the virtual environment by an avatar, which is typically in the form of an animated character. In the case of a virtual environment in the form of a battle field that avatar could be of a soldier.

The widespread uptake of visually immersive virtual environments is due in part to significant advances in image processing technology that enables highly detailed and realistic graphics virtual environment to be generated. The proliferation of three-dimensional sound cards provides the ability to supply participants in a virtual environment with high quality sound. However, despite the prolific use of three-dimensional sound cards today's visually immersive virtual environments are generally unable to provide realistic mechanisms for participants to communicate with each other. Many environments use non-immersive communication mechanisms such as text based chat or walkie-talkie style voice.

DEFINITIONS

The following provides definitions for various terms used throughout this specification:

Weighted audio stream—audio information that comprises one or more pieces of audio information, each of which has an amplitude that is modified (increased or decreased) based on a distance between a source and recipient of the audio information.

Unweighted audio stream—audio information that comprises one or more pieces of audio information, but unlike a weighted audio stream the amplitude of each piece of audio information in an unweighted audio stream is un-modified from the original amplitude.

Audio Scene—audio information comprising combined sounds (for example, voices belonging to other avatars and other sources of sound within the virtual environment) that are spatially placed and perhaps attenuated according to a distance between a source and recipient of the sound. An audio scene may also comprise sound effects that represent the acoustic characteristics of the environment.

SUMMARY OF THE INVENTION

According to a first aspect of the present invention there is provided an apparatus for creating an audio scene for an avatar in a virtual environment, the apparatus comprising:

an audio processor operable to create a weighted audio stream that comprises audio from an object located in a portion of a hearing range of the avatar; and associating means operable to associate the weighted audio stream with a datum that represents a location of the portion of the hearing range in the virtual environment, wherein the weighted audio stream and the datum represent the audio scene.

The apparatus according to the first aspect of the present invention has several advantages. One advantage is that by dividing the hearing range in to one or more portions, the fidelity of the audio scene can be adjusted to a required level. The greater the number of portions in the hearing range, the higher the fidelity of the audio scene. It is envisaged that the apparatus is not restricted to a single weighted audio stream for one portion. In fact, the apparatus is capable of multiple weighted audio streams each comprising audio from an object located in other portions of the hearing range. Another advantage of the apparatus is that the weighted audio stream can replicate characteristics such as attenuation of the audio as a result of having to travel a distance between the object and the recipient. Yet another advantage of the present invention is that the audio stream can be reproduced as if it emanated from the location. Thus, if the datum indicated that the location of the object was to the right hand side of the recipient, the audio could be reproduced using the right channel of a stereo sound system.

Preferably, the audio processor is further operable to create the weighted audio stream such that it comprises an unweighted audio stream that comprises audio from another object located in the portion of the hearing range of the avatar.

An advantage of including the unweighted audio stream in the weighted audio stream is that it provides a means for representing audio from one or more other objects that are located at the periphery of the portion of the hearing range of the avatar. An advantage of the unweighted audio stream is that it can be reused for creating audio scenes of many avatars, which can reduce the overall processing requirements for creating the audio scene.

Preferably, the audio processor is operable to create the weighted audio stream in accordance with a predetermined mixing operation, the predetermined mixing operation comprising identification information that identifies the object and/or the other objects, and weighting information that can be used by the audio processor to set an amplitude of the audio and unweighted audio stream in the weighted audio stream.

Preferably, the apparatus further comprises a communication means operable to receive the audio, the unweighted audio stream and the mixing operation via a communication network, the communication means further being operable to send the weighted audio stream and the datum via the communication network.

Using the communication means is advantageous because it enables the apparatus to be used in a distributed environment.

According to a second aspect of the present invention, there is provided an apparatus operable to create audio information for use in an audio scene for an avatar in a virtual environment, the apparatus comprising:

an audio processor operable to create an unweighted audio stream that comprises audio from an object located in a portion of a hearing range of the avatar; and associating means operable to associate the unweighted audio stream with a datum that represents an approximate location of the object in the virtual environment, wherein the unweighted audio stream and the datum represent the audio information.

The apparatus according to the second aspect of the present invention has several advantages, two of which are similar to the aforementioned first and second advantages of the first aspect of the present invention.

Preferably, the audio processor is operable to create the unweighted audio stream in accordance with a predetermined mixing operation, the predetermined mixing operation comprising identification information that identifies the object.

Preferably, the apparatus further comprises a communication means operable to receive the audio and the predetermined mixing operation via a communication network, the communication means also being operable to send the unweighted audio stream and the datum via the communication network.

Using the communication means is advantageous because it enables the apparatus to be used in a distributed environment.

According to a third aspect of the present invention there is provided an apparatus for obtaining information that can be used to create an audio scene for an avatar in a virtual environment, the apparatus comprising:

identifying means operable to determine an identifier of an object located in a portion of a hearing range of the avatar;

weighting means operable to determine a weighting to be applied to audio from the object; and locating means operable to determine a location of the portion in the virtual environment, wherein the identifier, weighting and the location represent the information that can be used to create the audio scene.

The ability of the third aspect of the present invention to obtain the weighting and the location is advantageous for several reasons. First, the weighting can be used to create a weighted audio stream that comprises the audio from the object. In this regard, the weighting can be used to set an amplitude of the audio when inserted into the weighted audio stream. Second, the location can be used to reproduce the audio as if it were coming from the location. For example, if the location indicated that the location of the object was to the right hand side of the recipient, the audio could be reproduced using the right channel of a stereo sound system.

Preferably, the apparatus further comprises a communication means operable to send, via a communication network, the identifier, the weighting and the location to one of a plurality of systems for processing.

Using the communication means is advantageous because it enables the apparatus to be used in a distributed environment. Furthermore, it enables the apparatus to send the identifier, the weighting and the location to a system that has the necessary resources (processing ability) to perform the required processing.

Preferably, the communication means is further operable to create routeing information for the communication network, wherein the routeing information is such that it can be used by the communication network to route the audio to the one of the plurality of system for processing.

Being able to provide the routeing information is advantageous because it allows the apparatus to effectively select the links in the communications network that will be used to transfer the audio.

Preferably, the identifying means, the weighting means and the locating means are operable to respectively determine the identifier, the weighting and the location by processing a representation of the virtue environment.

Preferably, the identifying means is operable to determine the portion of the hearing range by:

selecting a first of a plurality of avatars in the virtual environment;

identifying a second of the plurality of avatars that is proximate the first of the avatars;

determining whether the second of the avatars can be included in an existing cluster;

including the second of the avatars in the existing cluster upon determining that it can be included therein;

creating a new cluster that includes the second of the avatars upon determining that the second of the avatars cannot be included in the existing cluster to thereby create a plurality of clusters;

determining an angular gap between two of the clusters;

creating a further cluster that is substantially located in the angular gap; and including at least one of the avatars in the further cluster.

Alternatively, the identifying means is operable to determined the portion of the hearing range by:

selecting one of a plurality of avatars in the virtual environment;

determining a radial ray that extends from the avatar to the one of the plurality of avatars;

calculating the absolute angular distance that each of the plurality of avatars is from the radial ray;

arranging the absolute angular distance of each of the avatars into an ascending ordered list;

calculating a differential angular separation between successive ones of the absolute angular distance in the ascending ordered list;

selecting at least one of the differential angular separation that has a higher value than another differential angular separation; and determining another radial ray that emanates from the avatar and which bisects two of the avatars that are associated with the at least one of the differential angular separation.

According to a fourth aspect of the present invention there is provided an apparatus for creating information that can be used to create an audio scene for an avatar in a virtual environment, the apparatus comprising:

identifying means operable to determine an identifier of an object located in a portion of a hearing range of the avatar; and locating means operable to determine an approximate location of the object in the virtual environment, wherein the identifier and the approximate location represent the information that can be used to create the audio scene.

Determining the approximate location of the object is advantageous because it can be used to reproduce audio from the object as if it were emanating from the location.

Preferably, the apparatus further comprises a communication means operable to send, via a communication network, the identifier and the location to one of a plurality of systems for processing.

Using the communication means is advantageous because it enables the apparatus to be used in a distributed environment. Furthermore, it enables the apparatus to send the identifier, the weighting and the location to a system that has the necessary resources (processing ability) to perform the required processing.

Preferably, the communication means is further operable to create routeing information for the communication network, wherein the routeing information is such that it can be used by the communication network to route the audio to the one of the plurality of systems for processing.

Being able to provide the routeing information is advantageous because it allows the apparatus to effectively select the links in the communication network that will be used to transfer the audio.

Preferably, the identifying means and the locating means are operable to respectively determine the identifier and the location by processing a representation of the virtual environment.

Preferably, the identifying means is operable to determine the approximate location of the object by:

dividing the virtual environment into a plurality of cells; and determining a location in one of the cells about which the object is located.

According to a fifth aspect of the present invention there is provided an apparatus for rendering an audio scene for an avatar in a virtual environment, the apparatus comprising:

obtaining means operable to obtain a weighted audio stream that comprises audio from an object located in a portion of a hearing range of the avatar, and a datum that is associated with the weighted audio stream and which represents a location of the portion of the hearing range in the virtual environment; and a spatial audio rendering engine that is operable to process the weighted audio stream and the datum in order to render the audio scene.

According to a sixth aspect of the present invention there is provided a method of creating an audio scene for an avatar in a virtual environment, the method comprising the steps of:

creating a weighted audio stream that comprises audio from an object located in a portion of a hearing range of the avatar; and associating the weighted audio stream with a datum that represents a location of the portion of the hearing range in the virtual environment, wherein the weighted audio stream and the datum represent the audio scene.

Preferably, the step of creating the weighted audio stream is such that the weighted audio stream comprises an unweighted audio stream that comprises audio from another object located in the portion of the hearing range of the avatar.

Preferably, the step of creating the weighted audio stream is carried out in accordance with a predetermined mixing operation, the predetermined mixing operation comprising identification information that identifies the object and/or the other objects, and weighting information that can be used by the audio processor to set an amplitude of the audio and unweighted audio stream in the weighted audio stream.

Preferably, the method further comprises the steps of:

receiving the audio, the unweighted audio stream and the mixing operation via a communication network; and sending the weighted audio stream and the datum via the communication network.

According to a seventh aspect of the present invention, there is provided a method of creating audio information for use in an audio scene for an avatar in a virtual environment, the method comprising the steps of:

creating an unweighted audio stream that comprises audio from an object located in a portion of a hearing range of the avatar; and associating the unweighted audio stream with a datum that represents an approximate location of the object in the virtual environment, wherein the unweighted audio stream and the datum represent the audio information.

Preferably, the step of creating the unweighted audio stream is carried out in accordance with a predetermined mixing operation, wherein the predetermined mixing operation comprises identification information that identifies the object.

Preferably, the method further comprises the steps of:

receiving the audio and the predetermined mixing operation via a communication network; and sending the unweighted audio stream and the datum via the communication network.

According to a eighth aspect of the present invention there is provided a method of obtaining information that can be used to create an audio scene for an avatar in a virtual environment, the method comprising the steps of:

determining an identifier of an object located in a portion of a hearing range of the avatar;

determining a weighting to be applied to audio from the object; and determining a location of the portion in the virtual environment, wherein the identifier, weighting and the location represent the information that can be used to create an audio scene.

Preferably, the method further comprises the step of sending, via a communication network, the identifier, the weighting and the location to one of a plurality of systems for processing.

Preferably, the method further comprises the step of creating routeing information for the communication network, wherein the routeing information is such that it can be used by the communication network to route the audio to the one of the plurality of system for processing.

Preferably, the steps of determining the identifier, the weighting and the location respectively comprise determining the identifier, the weighting and the location by processing a representation of the virtual environment.

Preferably, the method further comprises the following steps to determine the portion of the hearing range:

selecting a first of a plurality of avatars in the virtual environment;

identifying a second of the plurality of avatars that is proximate the first of the avatars;

determining whether the second of the avatars can be included in an existing cluster;

including the second of the avatars in the existing cluster upon determining that it can be included therein;

creating a new cluster that includes the second of the avatars upon determining that the second of the avatars cannot be included in the existing cluster to thereby create a plurality of clusters;

determining an angular gap between two of the clusters;

creating a further cluster that is located in the angular gap; and including at least one of the avatars in the further cluster.

Alternatively, the method comprises the following steps to determine the position of the hearing range:

selecting one of a plurality of avatars in the virtual environment;

determining a radial ray that extends from the avatar to the one of the plurality of avatars;

calculating the absolute angular distance that each of the plurality of avatars is from the radial ray;

arranging the absolute angular distance of each of the avatars into an ascending ordered list;

calculating a differential angular separation between successive ones of the absolute angular distance in the ascending ordered list; and selecting at least one of the differential angular separation that has a higher value than another differential angular separation; and determining another radial ray that emanates from the avatar and which bisects two of the avatars that are associated with the differential angular separation.

According to a ninth aspect of the present invention there is provided a method of creating information that can be used to create an audio scene for an avatar in a virtual environment, the method comprising the steps of:

determining an identifier of an object located in a portion of a hearing range of the avatar; and determining an approximate location of the object in the virtual environment, wherein the identifier and the approximate location represent the information that can be used to create the audio scene.

Preferably, the method further comprises the step of sending, via a communication network, the identifier and the location to one of a plurality of systems for processing.

Preferably, the method further comprises the step of creating routeing information for the communication network, wherein the routeing information is such that it can be used by the communication network to route the audio to the one of the plurality of systems for processing.

Preferably, the steps of determining the identifier and the approximate location respectively comprise the step of determining the identifier and the location by processing a representation of the virtual environment.

Preferably, the method further comprises the following steps to determine the approximate location of the object:

dividing the virtual environment into a plurality of cells; and determining a location in one of the cells about which the object is located.

According to a tenth aspect of the present invention there is provided a method of rendering an audio scene for an avatar in a virtual environment, the method comprising the steps of:

obtaining a weighted audio stream that comprises audio from an object located in a portion of a hearing range of the avatar, and a datum that is associated with the weighted audio stream and which represents a location of the portion of the hearing range in the virtual environment; and processing the weighted audio stream and the datum in order to render the audio scene.

According to an eleventh aspect of the present invention there is provided a computer program comprising at least one instruction for causing a computing device to carry out the method according to the sixth, seventh, eight, ninth or tenth aspect of the present invention.

According to a twelfth aspect of the present invention there is provided a computer readable medium comprising the computer program according to the eleventh aspect of the present invention.

BRIEF DESCRIPTION OF THE DRAWINGS

Notwithstanding any other embodiments that may fall within the scope of the present invention, an embodiment of the present invention will now be described, by way of example only, with reference to the accompanying figures, in which:

FIG. 5 illustrates a control table used by the system shown in FIG. 1;

FIG. 10 illustrates another control table used by the system shown in FIG. 1;

AN EMBODIMENT OF THE INVENTION

Figure 1:
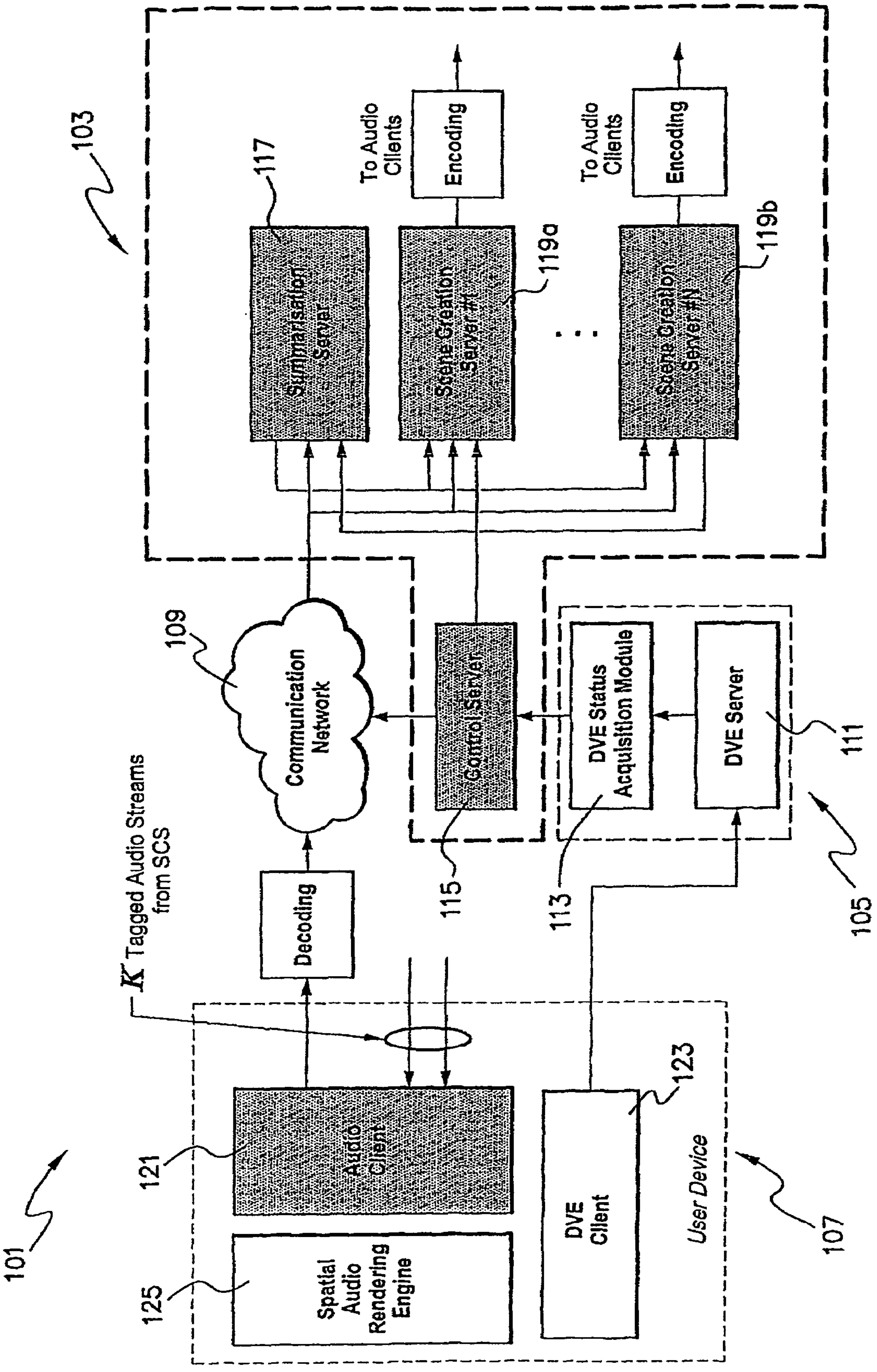
FIG. 1 provides a block diagram of a system in accordance with the embodiment of the present invention.

With reference to FIG. 1, which illustrates a system 101 embodying the present invention, the system 101 comprises: an audio scene creation system 103; a virtual environment state maintenance system 105; and a client computing device 107. The system 101 also comprises a communication network 109. The audio scene creation system 103, the virtual environment state maintenance system 105 and the client computing device 107 are connected to the communication network 109 and arranged to use the network 109 in order to operate in a distributed manner; that is, exchange information with each other via the communication network 109. The communication network 109 is in the form of a public access packet switched network such as the Internet, and is therefore made up of numerous interconnect routers (not shown in the figures).

Generally speaking, the virtual environment state maintenance system 105 is arranged to maintain dynamic state information pertaining to a virtual environment (such as a battlefield). The dynamic state information maintained by the system 105 includes, for example, the location of various avatars in the virtual environment and, where the virtual environment relates to a game, individual players' scores. The audio scene creation system 103 is basically arranged to create and manage the real-time audio related aspects of participants in the virtual environment (such as the participants voice); that is, create and manage audio scenes. The client computing device 107 is essentially arranged to interact with the virtual environment state maintenance system 105 and the audio scene creation system 103 to allow a person using the client computing device 107 to participate in the virtual environment.

More specifically, the graphical environment state maintenance system 105 is in the form of a computer server (or in an alternative embodiment, a plurality of distributed computer servers interconnected to each other) that comprises traditional computer hardware such as a motherboard, hard disk storage, and random access memory. In addition to the hardware the computer server also comprises an operating system (such as Linux or Microsoft Windows) that performs various system level operations (for example, memory management).

The operating system also provides an environment for executing application software. In this regard, the computer server comprises an application package that is loaded on the hard disk storage and which is capable of maintaining the dynamic state information pertaining to the virtual environment. In this regard, if the virtual environment was, for example, a battlefield then the dynamic state information may indicate that a particular avatar (which, for example, represents a soldier) is situated in a tank. The virtual environment state maintenance system 105 essentially comprises two modules 111 and 113 in the form of software. The first of the modules 111 is essentially responsible for sending and receiving the dynamic state information (pertaining to the virtual environment) to/from the client computing device 107. The second of modules 113 is arranged to send the dynamic state information to the audio scene creation system 103.

As mentioned previously, the audio scene creation system 103 is basically arranged to create and manage audio scenes. Each audio scene basically represents a realistic reproduction of the sounds that would be heard by an avatar in the virtual environment. In order to create the audio scenes, the audio scene creation system 103 comprises a control server 115, a summarisation server 117 (alternative embodiments of the present invention may include a plurality of distributed summarisation servers), and a plurality of distributed scene creation servers 119. The control server 115, the summarisation server 117 and the plurality of distributed scene creation servers 119 are connected to the communication network 109 and use the communication network 109 to cooperate with each other in a distributed fashion.

Figure 2:
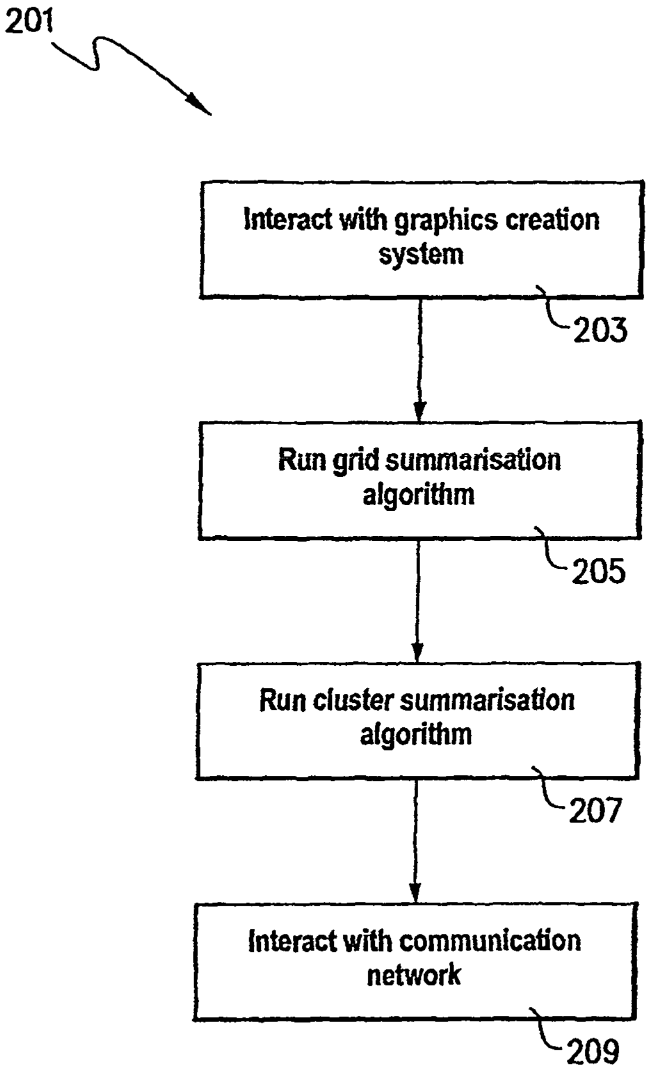
FIG. 2 provides a flow chart of various steps performed by the system shown in FIG. 1.

The control server 115 is in the form of a computer server that comprises traditional computer hardware such as a motherboard, hard disk storage, and random access memory. In addition to the hardware the computer server also comprises an operating system (such as Linux or Microsoft Windows) that performs various system level operations. The operating system also provides an environment for executing application software. In this regard, the computer server comprises application software that is loaded on the hard disk storage and which is arranged to carry out the various steps of the flow chart 201 shown in FIG. 2. The first step 203 that the application software performs is to interact with the virtual environment state maintenance system 105 to obtain the dynamic state information pertaining to the virtual environment. The application software obtains and processes the dynamic state information in order to identify the various avatars present in the virtual environment and the location of the avatars in the virtual environment. The virtual environment state maintenance system 105 can also process the dynamic state information to obtain details of the status of the avatars (for example, active or inactive) and details of any sound barriers. To obtain the dynamic state information the application software of the control server 115 interacts with the second of the modules 113 in the virtual environment state maintenance system 105 via the communication network 109.

Figure 3:
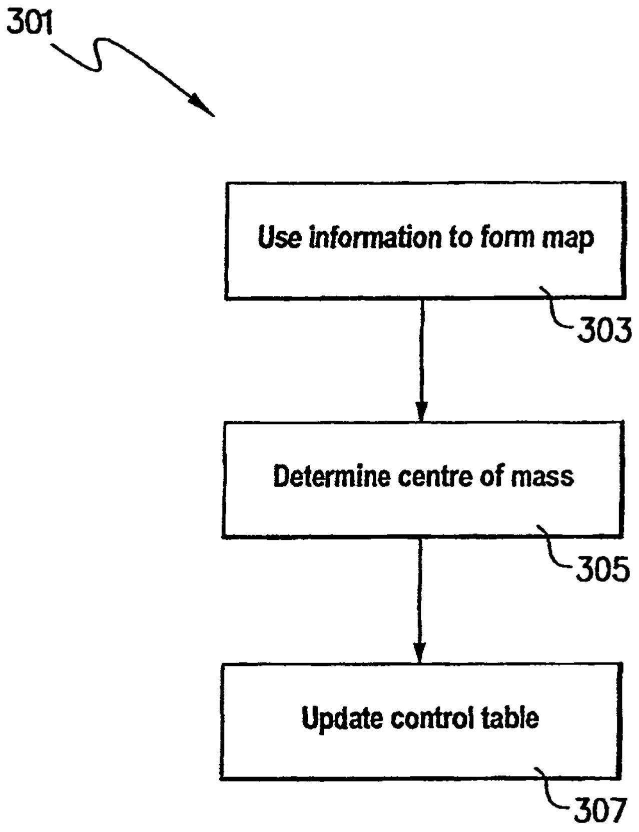
FIG. 3 provides a flow chart of the steps involved in a grid summarisation algorithm used in the system shown in FIG. 1.

Once the application software of the control server 115 has obtained the dynamic state information from the virtual environment state maintenance system 105, it proceeds to process the dynamic state information in order to create a number of mixing operation that are processed by the summarisation server 117 and scene creation servers 119 in order to create audio scenes for each avatar in the virtual environment. Following on from the initial step 203 the control server 115 performs the step 205 of running a grid summarisation algorithm. With reference to FIG. 3, which shows a flow chart 301 of the grid summarisation algorithm, the first step 303 of the grid summarisation algorithm is to use the dynamic state information obtained during the initial step 203 to form a map 401, which can be seen in FIG. 4, of the virtual environment. The map 401 is divided into a plurality of cells and depicts the location of the avatars in the virtual environment. The map 401 depicts the avatars as the small black dots. Whilst the present embodiment includes only a single map 401, it is envisaged that multiple maps 401 could be employed in alternative embodiments of the present invention.

It is noted that each avatar in the virtual environment is considered to have a hearing range that is divided into an interactive zone and a background zone. The interactive zone is generally considered the section of the hearing range immediately surrounding the avatar, whilst the background zone is the section of the hearing range that is located around the periphery (outer limits) of the hearing range. As an example, the interactive zone of a hearing range of an avatar in shown in FIG. 4 as a circle surrounding the avatar.

In forming the map 401, the application software of the control server 115 ensures that the size of each cell is greater than or equal to the interactive zone of the avatars.

The next step 305 performed when carrying out the grid summarisation algorithm is to determine a 'centre of mass' of each of the cells in the map 401. The centre of mass is basically determined by identifying the point in each cell around which the avatars therein are centred. The centre of mass can be considered an approximate location of the avatars in the virtual environment. The final step 307 in the grid summarisation algorithm is to update a control table 501 (which is shown in FIG. 5) used by the summarisation server 117 based on the map 401. The control table 501 comprises a plurality of rows, each of which represents one of the cells in the map 401. Each row also contains an identifier of each avatar in the respective cell and the centre of mass thereof. Each row in the control table 501 can effectively be considered a unweighted mixing operation. In order to update the control table 501 the application software of the control server 115, interacts with the summarisation server 117 via the communication network 109.

Figure 6:
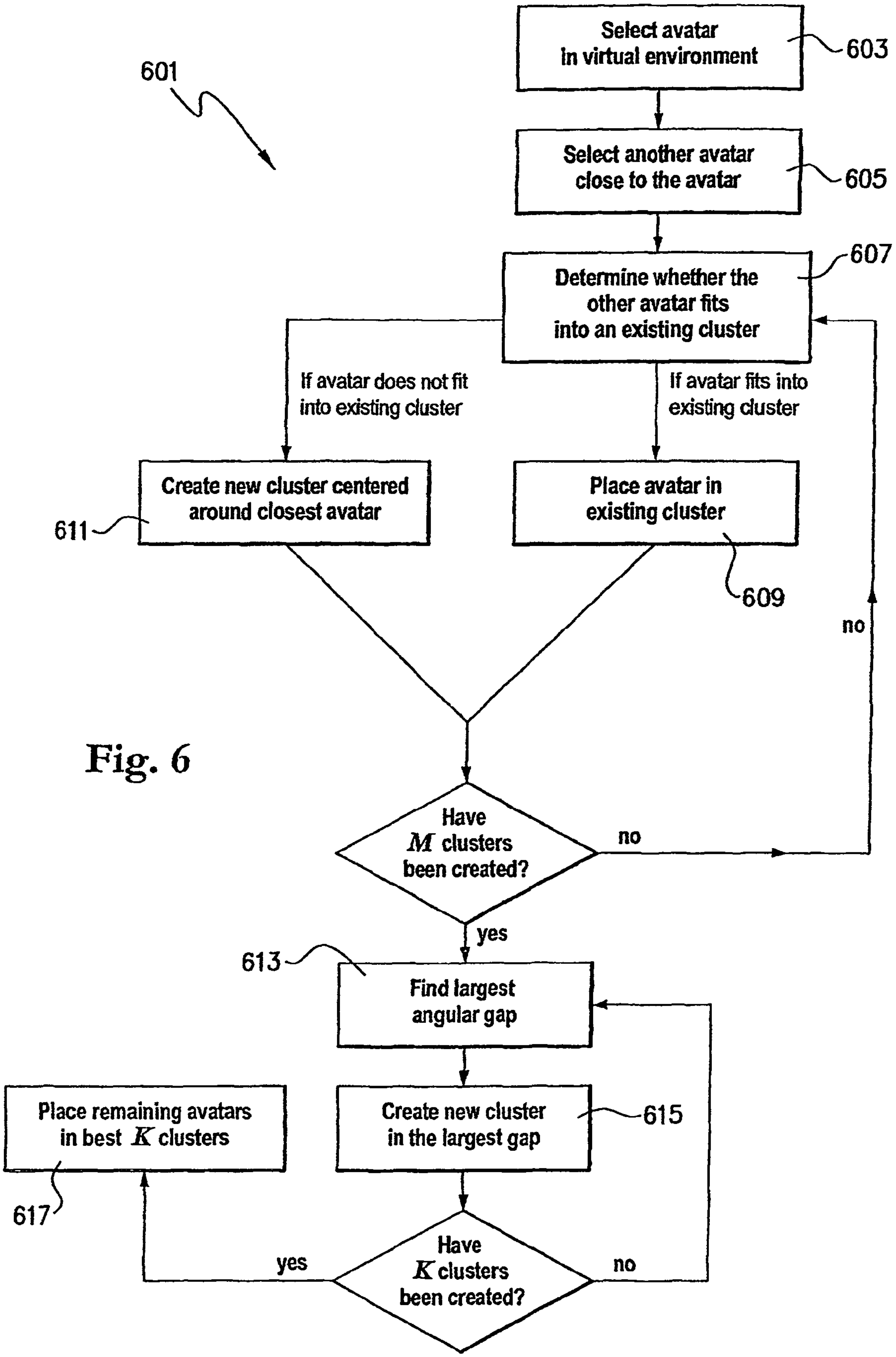
FIG. 6 provides a flow chart of the steps involved in a cluster summarisation algorithm used in the system shown in FIG. 1.

Once the application software of the control server 115 has completed the step 205 of running the grid summarisation algorithm, the next step 207 it performs is to run a cluster summarisation algorithm. FIG. 6 provides a flow chart 601 of the various steps involved in the cluster summarisation algorithm. The first step 603 of the cluster summarisation algorithm is to select a first of the avatars in the virtual environment. Following on from the first step 603 the cluster summarisation algorithm involves the step 605 of selecting a second of the avatars that is closest to the first of the avatars, which was selected during the first step 603. Once the second of the avatars has been selected, the cluster summarisation algorithm involves the step 607 of determining whether the second of the avatars fits in to a previously defined cluster. Following on from the previous step 607 the cluster summarisation algorithm involves the step 609 of placing the second of the avatars in to the previously defined cluster if it fits therein. On the other hand if it is determined that the second of the avatars does not fit in to a previously defined cluster then the cluster summarisation algorithm involves carrying out the step 611 of establishing a new cluster that is centred around the second of the clusters. It is noted that the preceding steps 603 to 611 are performed until a predetermined number of clusters M are established.

Once the M clusters have been established, the cluster summarisation algorithm involves performing the step 613 of finding the largest angular gap between the M clusters. Once the largest angular gap has been determined the cluster summarisation algorithm involves the step 615 of establishing a new cluster in the largest angular gap. The previous steps 613 and 615 are repeated until a total of K clusters have been established. It is noted that the number of M clusters is ≤the number of K clusters.

The final step 617 of the cluster summarisation algorithm involves placing all remaining avatars within the best of the K clusters, which are those clusters that result in the least angular error; that is, the angular difference between where a sound source is rendered from the perspective of the first of the avatars and the actual location of the sound source if the sound from the source was not summarised.

Figure 7:
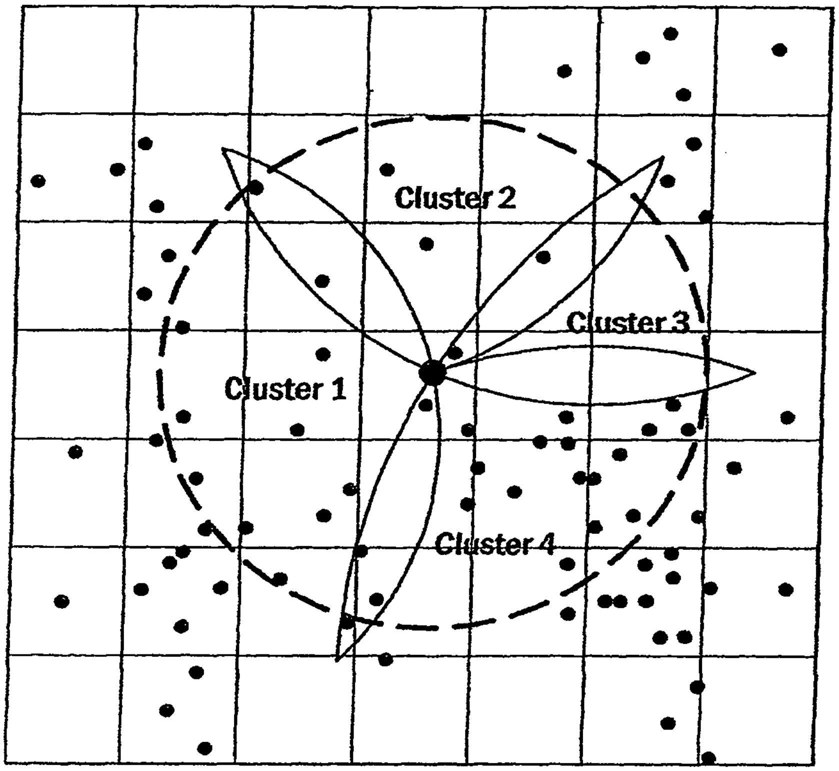
FIG. 7 is an illustration of the clusters formed using the algorithm of FIG. 6.

Once the steps 603 to 617 of the cluster summarisation algorithm have been performed the application software running on the control server 115 proceeds to carry out the last step 209, which is discussed in detail in subsequent paragraphs of this specification. An illustration of the clusters established using the cluster summarisation algorithm is shown in FIG. 7.

Figure 8:
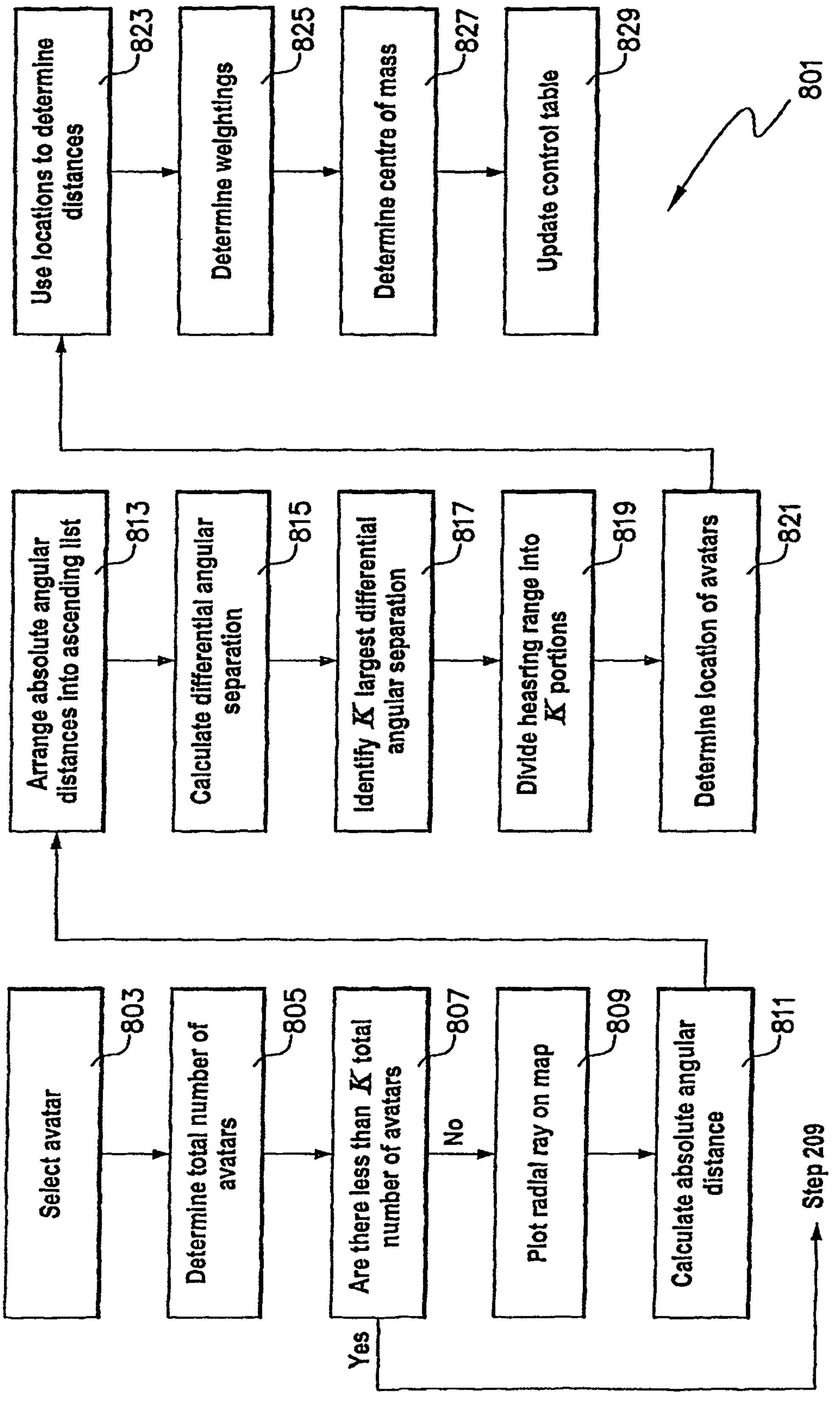
FIG. 8 is a flow chart of the various steps involved in an alternative clustering algorithm.

Persons skilled in the art will readily appreciate that the present invention is not limited to being used with the aforementioned clustering algorithm. By way of example, the following describes an alternative clustering algorithm that can be employed in another embodiment of the present invention. The flow chart 807 in FIG. 8 shows the steps involved in the alternative clustering algorithm.

The first step 803 of the alternative cluster summarisation algorithm is to select one of the avatars in the virtual environment. The next step 805 is to then determine the total number of avatars and grid summaries that are located in the hearing range of the avatar. The grid summaries are essentially unweighted audio streams produced by the summarisation server 117. A detailed description of this aspect of the summarisation server 117 is set out in subsequent paragraphs of this specification.

Following on from the previous step 805, the next step 807 is to assess whether the total number of avatars and grid summaries in the hearing range is less than or equal to K, which is a number selected based on the amount of bandwidth available for transmitting an audio scene. If it is determined that the total number of avatars and grid summaries is less than or equal to K, then the application software running on the control server 115 proceeds to the final step 209 of the algorithm (which is discussed in subsequent paragraphs of this specification).

Figure 9:
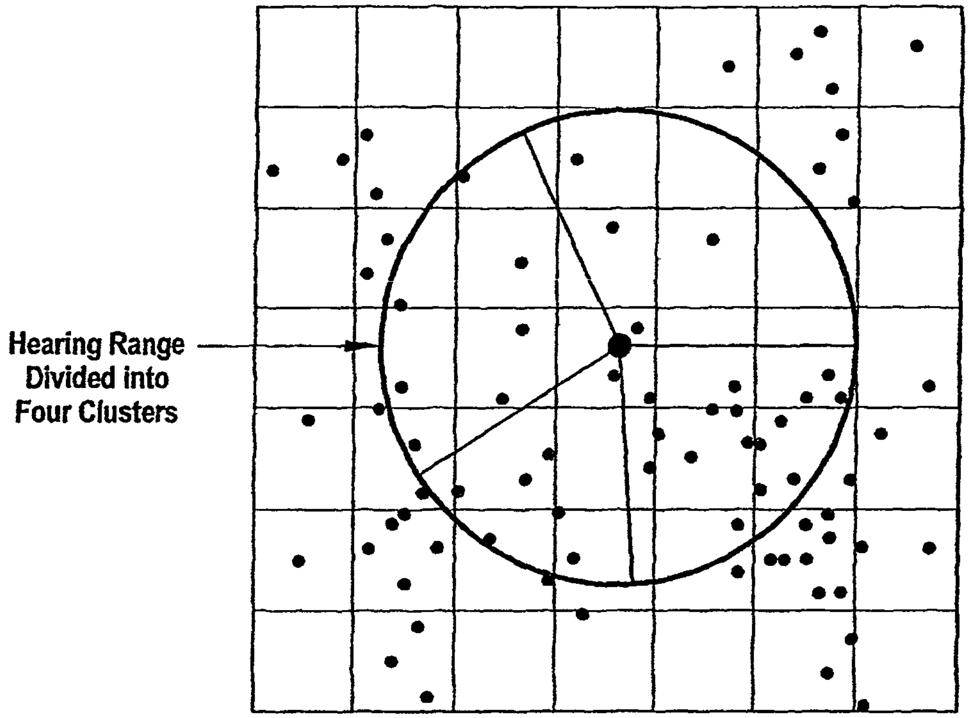
FIG. 9 provides a visual depiction of the result of running the alternative clustering algorithm of FIG. 8 on the map shown in FIG. 4.

In the event that the total number of avatars and/or grid summaries in the hearing range is greater than K, the control server 115 continues to carry out the alternative cluster summarisation algorithm. In this situation the next step 809 in the alternative cluster summarisation algorithm is to effectively plot on the map 401 a radial ray that emanates from the avatar (selected during the previous step 803) and goes through any of the other avatars in the hearing range of the avatar. Subsequent to step 809, the next step 811 is to calculate the absolute angular distance of every avatar and grid summary in the hearing range of the avatar. Following on from step 811 the alternative clustering algorithm involves the step 813 of arranging the absolute angular distances in an ascending ordered list. The next step 815 is to calculate the differential angular separation of each two successive absolute angular distances in the ascending ordered list. Once the previous step 815 has been carried out, the next step 817 is to identify the K largest differential angular distances. The next step 819 is to divide the hearing range of the avatar into K portions by effectively forming radial rays between each of the avatars that are associated with the K highest differential angular distances. The area between the radial rays is referred to as a portion of the hearing range. FIG. 9 depicts the effect of running the alternative cluster summarisation algorithm on the map 401.

As an example of the previous steps of the alternative cluster summarisation algorithm, consider a virtual environment comprising a total of 10 avatars/grid summaries, and a K that equals 4. Assume that the initial steps 811 and 813 of the alternative cluster summarisation algorithm result in the following list of absolute angular distances in ascending ordered:

0, 10, 16, 48, 67, 120, 143, 170, 222 and 253, which correspond respectively to avatars/grid summaries $A_0$ to $A_9$.

The subsequent step 815 of the alternative cluster summarisation algorithm which involves calculating the differential angular separation of each two successive absolute angular distances in the above list will result in the following:

10, 6, 32, 19, 53, 23, 27, 52, 31 and 107

The step 817 of the alternative cluster summarisation algorithm which involves identifying the K (4) largest differential angular distances will result in the following being selected:

107, 53, 52 and 32

The step 819 of the alternative cluster summarisation algorithm which involves dividing the hearing ranging into portions will result in the following K (4) clusters of avatars being defined:

1: $A_0$, $A_1$ and $A_3$

2: $A_3$ and $A_4$

3: $A_5$, $A_6$ and $A_7$

4: $A_8$ and $A_9$

Following on from the previous steps, the alternative cluster summarisation algorithm involves the step 821 of determining the locations of the avatars in the virtual environment. The application software running on the control server 115 does this by interacting with the second of the modules 113 in the virtual environment state maintenance system 105. Once the location of the avatars has be determined, the alternative cluster summarisation algorithm involves the step 823 of using the locations of the avatars to determine a distances between the avatars and the avatar for which the alternative cluster summarisation algorithm is being run. Subsequent to the step 823 the alternative cluster summarisation algorithm involves the step 825 of using the distances to determine a weighting to be applied to audio emanating from the avatars in the hearing range of the avatar. The step 825 also involves the step of using the centre of mass (determined from the grid summarisation algorithm) to determine a weighting for each of the grid summaries in the hearing range of the avatar.

At this stage, the alternative cluster summarisation algorithm involves the step 827 of determining a centre of mass for each of the portions of the hearing range identified during the previous step 819 of dividing up the hearing range. As with the grid summarisation algorithm, the alternative cluster summarisation algorithm determines the centre of mass by selecting a location in each of the portions around which the avatars are centred.

The final step 829 of the alternative cluster summarisation algorithm involves updating a control table 1001 (which is shown in FIG. 10) in the scene creation servers 119. This involves updating the control tables 1001 to include the identifier of each of the avatars in the portions of the hearing range, the weightings to be applied to the avatars in the portions, and the centre of mass of each of the portions. It is noted that the control server 115 updates the control table 1001 in the scene creation server 119 via the communication network 109.

As can be seen in FIG. 10, the control table 1001 in the scene creation servers 119 comprises a plurality of rows. Each of the rows corresponds to a portion of the hearing range of an avatar and contains the identifiers of the avatars/grid summaries ($S_n$ and $Z_i$, respectively) in each portion of the hearing range. Each row of the control table 1001 also comprises the weighting to be applied to audio from the avatars/grid summaries (W), and the centre of mass of the portions, (which is contained in the "Location Coord" column of the control table 801). The centre of mass is in the form of x, y coordinates.

Upon completing the final step 829 of the alternative cluster summarisation algorithm, the application software running on the control server 115 proceeds to carry out its last step 209. The last step 209 involves interacting with the communication network 109 to establish specific communication links. The communication links are such that that they enable audio to be transferred from the client computing device 107 to the summarisation server 117 and/or the scene creation servers 119, and grid summaries (unweighted audio streams) to be transferred from the summarisation server 117 to the scene creation servers 119.

Figure 11:
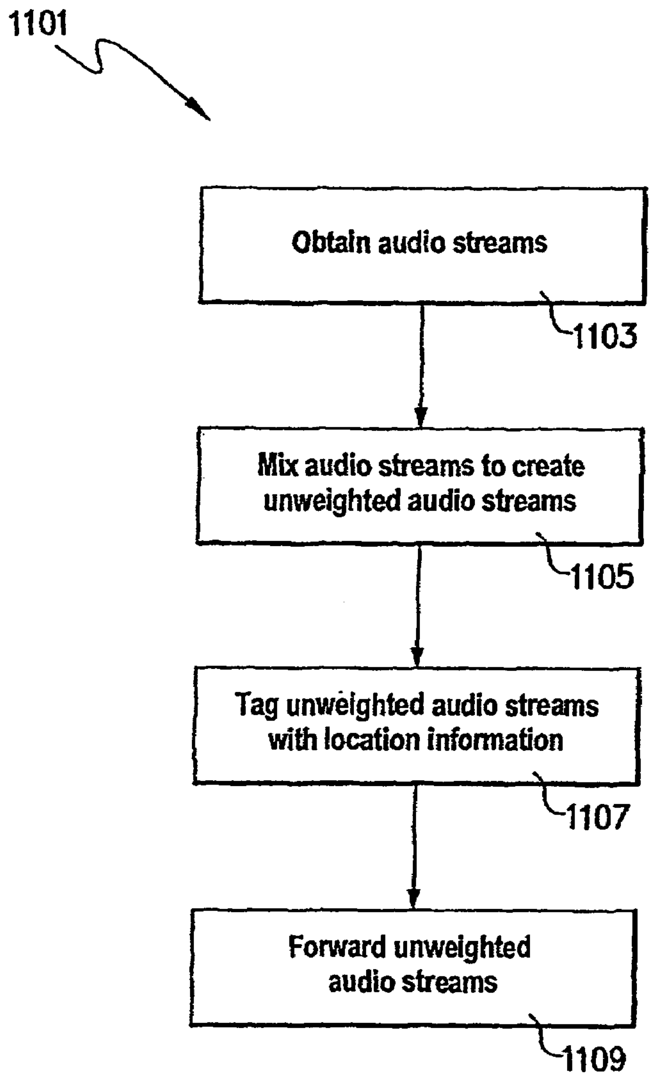
FIG. 11 provides a flow chart of the steps involved in a process performed by the system shown in FIG. 1.

Once the control server 115 has completed the previous steps 203 to 209, the summarisation server 117 is in a position to create unweighted audio streams (grid summaries). The summarisation server 117 is in the form of a computer server that comprises traditional computer hardware such as a motherboard, hard disk storage means, and random access memory. In addition to the hardware the computer server also comprises an operating system (such as Linux or Microsoft Window) that performs various system level operations. The operating system also provides an environment for executing application software. In this regard, the computer server comprises application software that is arranged to carry out a mixing process, the steps of which are shown in the flow chart 1101 illustrated in FIG. 11, in order to create unweighted audio streams.

Figure 4:
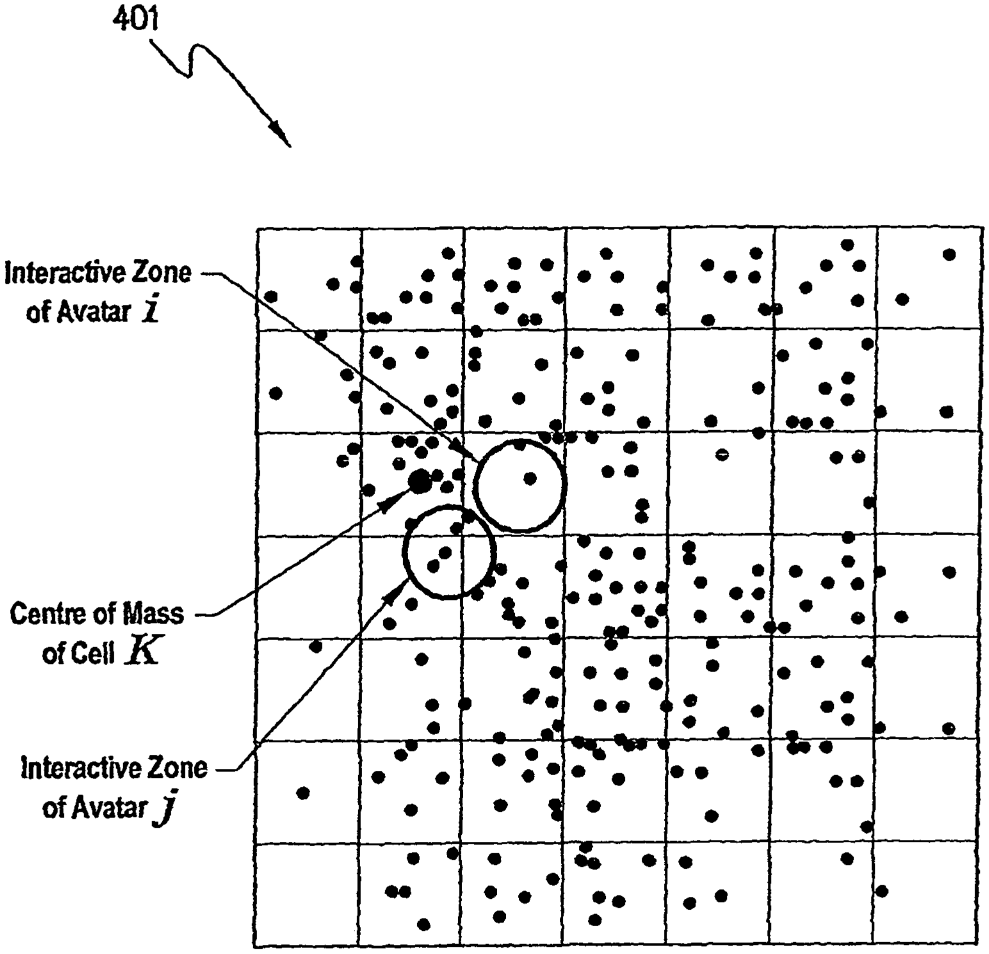
FIG. 4 illustrates a map used by the system shown in FIG. 1.

The first step 1103 of the flow chart 1101 is to obtain the audio streams $S_n$ associated with each of the avatars identified in the "Streams to be mixed" column of the control table 501 in the summarisation server 117. The control table 501 being illustrated in FIG. 5. It is noted that the summarisation server 117 obtains the audio streams $S_n$ via the communication network 109. In this regard, the previous step 209 of the control server 115 interacting with the communication network 109 established the necessary links in the communication network 109 to enable the summarisation server 117 to receive the audio streams $S_n$. Then for each row in the control table 501, the next step 1105 is to mix together the identified audio streams $S_n$, to thereby produce M mixed audio streams. Each of the M mixed audio streams comprises the audio streams $S_n$ identified in the "Streams to be mixed" column of each of the M rows in the control table 501. When mixing the audio streams $S_n$ during the mixing step 1105 each audio stream $S_n$ is such that they have their original unaltered amplitude. The M mixed audio streams are therefore considered unweighted audio streams. As indicated previously, the unweighted audio streams contain audio from the avatars located in the cells of the map 401, which is shown in FIG. 4.

The next step 1107 in the flow chart 1101 is to tag the unweighted audio streams with the corresponding centre of mass of the respective cell in the map 401. This step 1107 effectively involves inserting the x, y coordinates from the "centre of mass of the cell" columns of the control table 501. The final step 1109 in the process 1101 is to forward the unweighted audio streams from the summarisation server 117 to the appropriate scene creation server 119, which is achieved by using the communication network 109 to transfer the unweighted audio streams from the summarisation server 117 to the scene creation server 119. The previous step 209 of the control server 115 interacting with the communication network 109 established the necessary links in the communication network 109 to enable the unweighted audio streams to be transferred from the summarisation server 117 to the scene creation server 119.

Once the unweighted audio streams have been transferred to the scene creation server 119 it is in a position to carry out a mixing process to create weighted audio streams. The steps involved in the mixing process are shown in the flow chart 1201 of FIG. 12. Each scene creation server 119 is in the form of a computer server that comprises traditional computer hardware such as a motherboard, hard disk storage means, and random access memory. In addition to the hardware the computer server also comprises an operating system (such as Linux or Microsoft Window) that performs various system level operations. The operating system also provides an environment for executing application software. In this regard, the computer server comprises application software that is arranged to carry out the various steps of the flow chart 1201.

Figure 12:
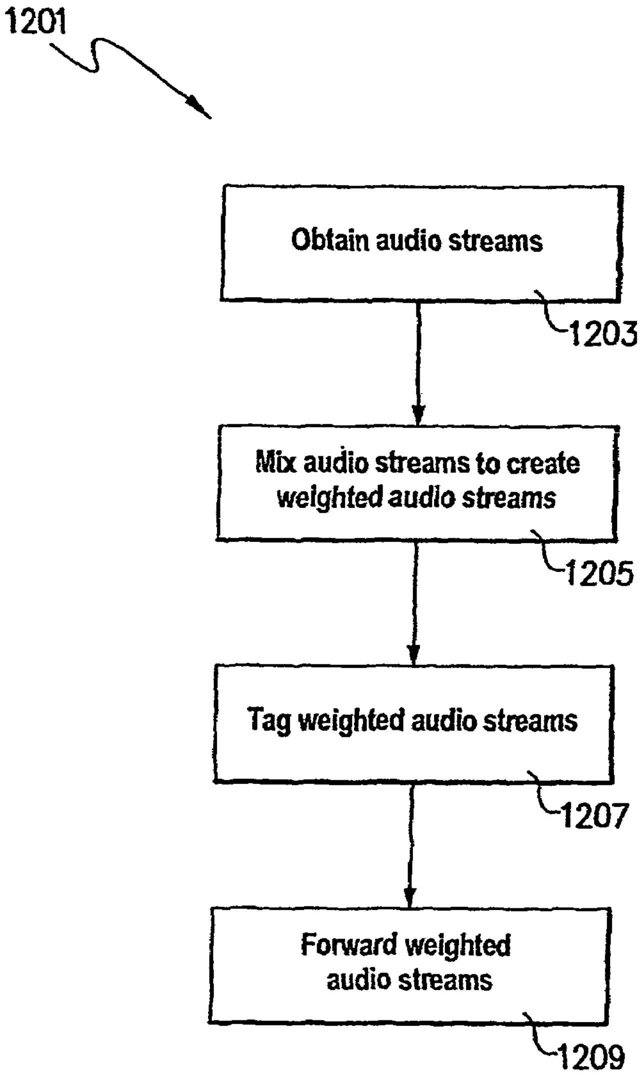
FIG. 12 provides a flow chart of the steps involved in a process performed by the system shown in FIG. 1.

The steps of the flow chart 1201 are essentially the same as the steps of the flow chart 1101 carried out by the summarisation server 117, except that instead of producing an unweighted audio stream the steps of the latter flow chart 1201 result in weighted audio streams being created. As can be seen in FIG. 12 the first step 1203 involves obtaining the audio streams $Z_i$ and $S_n$ identified in the control table 1001 of the scene creation server 119, where $Z_i$ is an unweighted audio stream from the summarisation server 117 and $S_n$ is an audio stream associated with a particular avatar. Then, for each row in the control table 1001, the flow chart 1201 involves the step 1205 of mixing the audio streams $Z_i$ and $S_n$ identified in the "Cluster summary streams" of the control table 1001, to thereby produce weighted audio streams. Each of the weighted audio streams comprises the audio streams $Z_i$ and $S_n$ identified in the corresponding row of the control table 1001. Unlike the unweighted audio streams created by the summarisation server 117, the amplitude of the audio streams $Z_i$ and $S_n$ in the weighted audio streams have different amplitudes. The amplitudes are determined during the mixing step 1205 by effectively multiplying the audio streams $Z_i$ and $S_n$ by their associated weightings $W_n$, which are also contained in the "Cluster summary streams" column of the control table 1001.

The next step 1207 in the flow chart 1201 is to tag the weighted audio streams with the center of mass contained in the corresponding "Location Coord" column of the control table 1001. This effectively involves inserting the x, y coordinates contained in the "Location Coord" column. The final step 1209 of the flow chart 1201 is to forward, via the communication network 109, the weighted audio streams to the client computing device 107 for processing.

The client computing device 107 is in the form of a personal computer comprising typical computer hardware such as a motherboard, hard disk and memory. In addition to the hardware, the client computing device 107 is loaded with an operating system (such as Microsoft Windows) that manages various system level operations and provides an environment in which application software can be executed. The client computing device 107 also comprises: an audio client 121; a virtual environment client 123; and a spatial audio rending engine 125. The audio client 121 is in the form of application software that is arranged to receive and process the weighted audio streams from the scene creation servers 119. The spatial audio rending engine 125 is in the form of audio rending software and soundcard. On receiving the weighted audio streams from the scene creation server 119, the audio client 121 interacts with the spatial audio rending engine 125 to render (reproduce) the weighted audio streams and thereby create an audio scene to the person using the client computing device 107. In this regard, the spatial audio rending engine 125 is connected to a set of speakers that are used to convey the audio scene to the person. It is noted that the audio client 121 extracts the location information inserted into the weighted audio stream by a scene creation server 119 during the previous step 1207 of tagging the weighted audio streams. The extracted location information is conveyed to the spatial audio rending engine 125 (along with the weighted audio streams), which in turn uses the location information to reproduce the information as if it was emanating from the location; that is, for example from the right hand side.

The virtual environment client 123 is in the form of software (and perhaps some dedicated image processing hardware in alternative embodiments) and is basically arranged to interact with the first of the modules 111 of the virtual environment state maintenance system 105 in order to obtain the dynamic state information pertaining to the virtual environment. On receiving the dynamic state information the graphics client 123 process the dynamic state information to reproduce (render) the virtual environment. To enable the virtual environment to be displayed to the person using the client computing device 107, the client computing device 107 also comprises a monitor (not shown). The graphics client 123 is also arranged to provide the virtual environment state maintenance system 105 with dynamic information pertaining to the person's presence in the virtual environment.

Those skilled in the art will appreciate that the invention described herein is susceptible to variations and modifications other than those specifically described. It should be understood that the invention includes all such variations and modifications which fall within the spirit and scope of the invention.

We claim:

1. An apparatus for creating an audio scene for an avatar in a virtual environment, the apparatus comprising:

an audio processor operable to create a weighted audio stream that comprises audio from an object located in a portion of a hearing range of the avatar in the virtual environment, the audio from the object is modified based on a distance between the object and the avatar; and associating means operable to associate the weighted audio stream with a datum that represents a location of the object in the portion of the hearing range of the avatar, wherein the weighted audio stream and the datum represent the audio scene;

wherein the audio processor is further operable to create the weighted audio stream such that it also includes an unweighted audio stream that comprises audio from another object located in the portion of the hearing range of the avatar.

2. The apparatus as claimed in claim 1, wherein the audio processor is operable to create the weighted audio stream in accordance with a predetermined mixing operation, the predetermined mixing operation comprising identification information that identifies the object and/or other objects, and weighting information that can be used by the audio processor to set an amplitude of the audio and unweighted audio stream in the weighted audio stream.

3. The apparatus as claimed in claim 2, wherein the apparatus further comprises a communication means operable to receive the audio, the unweighted audio stream and the mixing operation via a communication network, the communication network also being operable to send the weighted audio stream and the datum via the communication network.

4. A method of creating an audio scene for an avatar in a virtual environment, the method comprising the steps of:

creating a weighted audio stream that comprises audio from an object located in a portion of a hearing range of the avatar in the virtual environment, the audio from the object is modified based on a distance between the object and the avatar; and associating the weighted audio stream with a datum that represents a location of the object in the portion of the hearing range of the avatar, wherein the weighted audio stream and the datum represent the audio scene;

wherein creating step creates the weighted audio stream such that it also includes an unweighted audio stream that comprises audio from another object located in the portion of the hearing range of the avatar.

5. The method as claimed in claim 4, wherein the step of creating the weighted audio stream is carried out in accordance with a predetermined mixing operation, the predetermined mixing operation comprising identification information that identifies the object and/or other objects, and weighting information that can be used by the audio processor to set an amplitude of the audio and unweighted audio stream in the weighted audio stream.

6. The method as claimed in claim 5, further comprises the steps of:

receiving the audio, the unweighted audio stream and the mixing operation via a communication network; and sending the weighted audio stream and the datum via the communication network.

7. A non-transitory computer readable medium storing instructions which when executed by one or more processors cause performance of the steps of:

creating a weighted audio stream that comprises audio from an object located in a portion of a hearing range of the avatar in the virtual environment, the audio from the object is modified based on a distance between the object and the avatar; and associating the weighted audio stream with a datum that represents a location of the object in the portion of the hearing range of the avatar, wherein the weighted audio stream and the datum represent the audio scene;

wherein the creating step creates the weighted audio stream such that it also includes an unweighted audio stream that comprises audio from another object located in the portion of the hearing range of the avatar.

8. The non-transitory computer readable medium as claimed in claim 7, wherein the step of creating the weighted audio stream is carried out in accordance with a predetermined mixing operation, the predetermined mixing operation comprising identification information that identifies the object and/or other objects, and weighting information that can be used by the audio processor to set an amplitude of the audio and unweighted audio stream in the weighted audio stream.

9. The non-transitory computer readable medium as claimed in claim 8, further comprising:

receiving the audio, the unweighted audio stream and the mixing operation via a communication network; and sending the weighted audio stream and the datum via the communication network.

10. An apparatus for rendering an audio scene for an avatar in a virtual environment, the apparatus comprising:

obtaining means operable to obtain a weighted audio stream that comprises audio from an object located in a portion of a hearing range of the avatar in the virtual environment, and a datum that is associated with the weighted audio stream and which represents a location of the object in the portion of the hearing range of the avatar, the audio from the object is modified based on a distance between the object and the avatar; and a spatial audio rendering engine that is operable to process the weighted audio stream and the datum in order to render the audio scene;

wherein the weighted audio stream also includes an unweighted audio stream that comprises audio from another object located in the portion of the hearing range of the avatar.

11. A method of rendering an audio scene for an avatar in a virtual environment, the method comprising the steps of:

obtaining a weighted audio stream that comprises audio from an object located in a portion of a hearing range of the avatar in the virtual environment, and a datum that is associated with the weighted audio stream and which represents a location of the object in the portion of the hearing range of the avatar, the audio from the object is modified based on a distance between the object and the avatar; and processing the weighted audio stream and the datum in order to render the audio scene;

wherein the weighted audio stream also includes an unweighted audio stream that comprises audio from another object located in the portion of the hearing range of the avatar.

12. A non-transitory computer readable medium storing instructions which when executed by one or more processors cause performance of the steps of:

obtaining a weighted audio stream that comprises audio from an object located in a portion of a hearing range of the avatar in the virtual environment, and a datum that is associated with the weighted audio stream and which represents a location of the object in the portion of the hearing range of the avatar, the audio from the object is modified based on a distance between the object and the avatar; and processing the weighted audio stream and the datum in order to render the audio scene;

wherein the weighted audio stream also includes an unweighted audio stream that comprises audio from another object located in the portion of the hearing range of the avatar.

* * * * *